Dec. 25, 1928.
O. M. CRUMLY
1,696,527
SAW ATTACHMENT FOR TRACTORS
Filed June 14, 1927   2 Sheets-Sheet 1
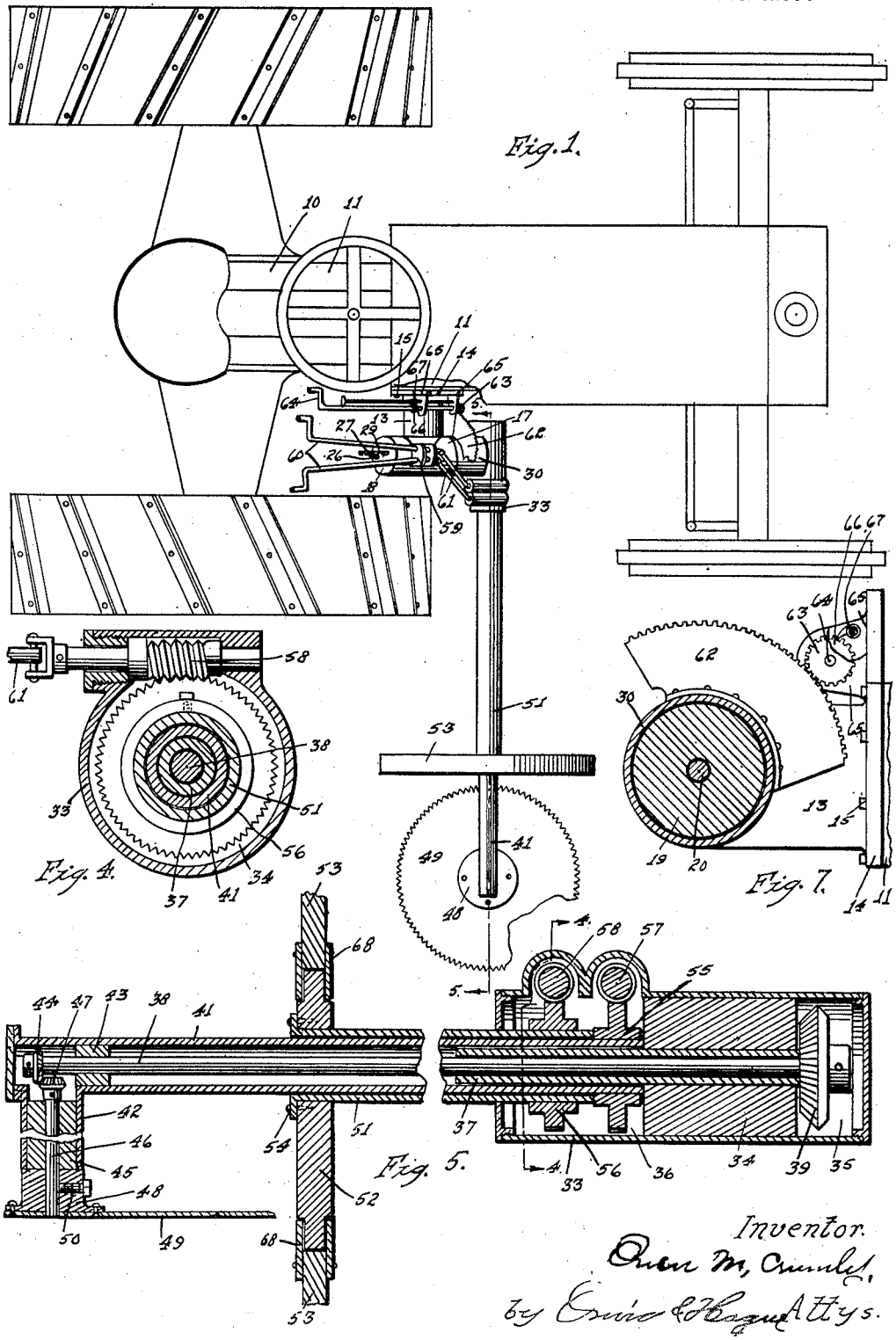

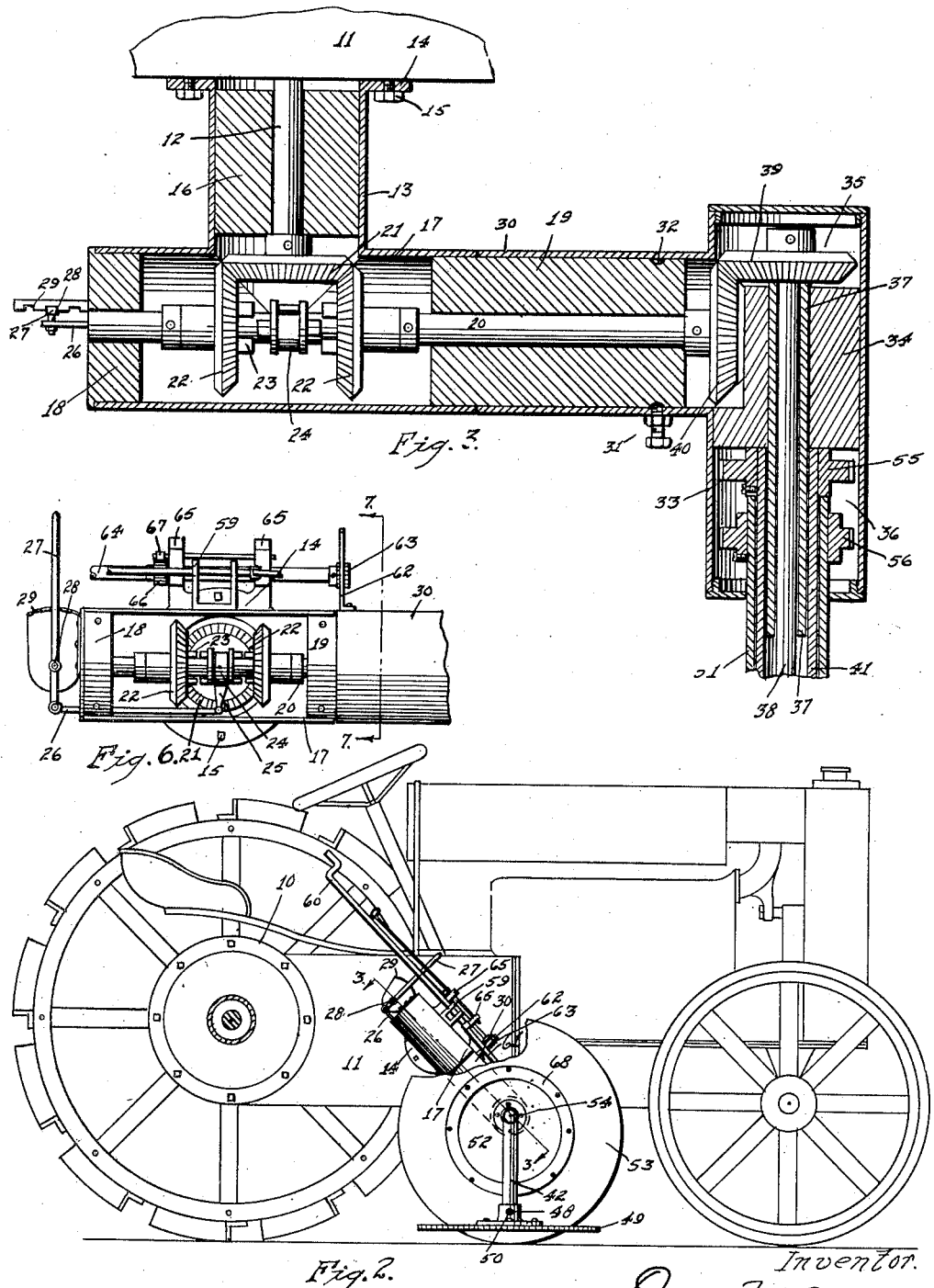

Patented Dec. 25, 1928.

1,696,527

UNITED STATES PATENT OFFICE.

OWEN M. CRUMLY, OF CARLISLE, IOWA.

SAW ATTACHMENT FOR TRACTORS.

Application filed June 14, 1927. Serial No. 198,791.

The object of my invention is to provide a saw attachment of simple, durable and inexpensive construction which may be easily and quickly applied to a farm tractor, and when so applied is adapted to receive its power from the power shaft of the tractor, and adapted for various kinds of sawing, such as cutting down brush and small trees, or cutting horizontally arranged logs into short lengths.

A further object is to provide a saw attachment for tractors particularly adapted to cut down standing brush and small trees, the cutting device being in the form of a circular saw adapted to have one face supported substantially parallel and adjacent to the ground surface; and to provide in connection therewith means whereby the saw will automatically follow the contour of the ground surface; and further to provide in connection therewith improved means for elevating and lowering the saw, and for adjusting the inclination of the saw blade relative to the ground surface.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of a farm tractor showing the manner in which my improved saw attachment is attached thereto.

Figure 2 is a side elevation of same, a portion of the gauge wheel being broken away.

Figure 3 is a detail sectional view taken on the line 3—3 of Figure 2.

Figure 4 is a detail sectional view taken on the line 4—4 of Figure 5.

Figure 5 is a detail sectional view taken on the line 5—5 of Figure 1.

Figure 6 is a side elevation of the gear casing, the cover of said casing being removed.

Figure 7 is a detail sectional view taken on the line 7—7 of Figure 6.

The numeral 10 indicates generally a farm tractor having a tractor frame 11 from which a power shaft 12 projects laterally. Secured to one side of the frame 11 is a transversely extending gear casing 13, having flanges 14, said flanges being bolted to the frame 11 by means of suitable bolts 15 with the gear casing 13 surrounding the shaft 12. A suitable bearing 16 is provided for supporting the shaft. The outer end of the casing 13 is provided with a longitudinally arranged portion 17. The portion 17 is provided with bearings 18 and 19, in which is rotatively mounted a shaft 20. The outer end of the shaft 12 is provided with a bevel gear 21 designed to continuously operate bevel gears 22, rotatively mounted on the shaft 20. The inner faces of the bevel gears 22 are provided with clutch jaws 23. A clutch member 24 is feathered to the shaft 20 and designed to operatively connect one of the gears 22 with the shaft 20 when slid to one of its outer positions of movement, and to engage the other clutch member when moved to its opposite position of movement for reversing the shaft 20. The clutch member 24 is operated through a yoke 25 of ordinary construction and a link 26 secured to the lower end of a lever 27, said lever being pivotally mounted to a sector 28 having notches 29 for locking the lever in a neutral or either of the two working positions.

Rotatively mounted on the forward end of the bearing 19 is what I shall term a second gear casing 30, said casing being supported against longitudinal movement by means of a set screw 31 operating in an annular groove 32. The forward end of the second gear casing is provided with a transversely arranged portion 33, in which is supported a bearing block 34, said bearing block being located in a position between the ends of the portion 33 to provide gear chambers 35 and 36. The bearing block 34 is provided with a sleeve 37 in which is rotatively mounted a shaft 38. The inner end of the shaft 38 is provided with a bevel gear 39 designed to mesh with a bevel gear 40 on the forward end of the shaft 20. The shaft 20 is located centrally within the bearing 19 so that the second gear casing may be swung concentrically about the shaft 20, so that the gears 39 and 40 will be maintained in operative relation with each other when the said gear casing is swung in it various positions of movement.

The outer end of the sleeve 37 is extended outwardly beyond the block 34, and preferably beyond the end of the portion 33 and is designed to rotatively support a tubular shaft 41, having at its outer end a perpendicular portion 42. The outer end of the member 41 is provided with a bearing 43 for supporting the outer end of the shaft 38, which is provided with a bevel gear 44. The portion 42 is provided with a bearing 45 in which is mounted a rotatively mounted saw shaft 46 having a bevel gear 47 on its upper end designed to mesh with the gear 44. The outer end of the shaft 46 is provided with a hub 48 to which the saw blade 49 is riveted, said blade being secured in such manner that its under surface is free from obstruction, so the blade may be operated very close to the ground surface without engaging obstructions. The hub 48 is preferably detachably secured to the shaft 46 by means of a set screw 50.

Rotatively mounted on the tubular shaft 41 is a supporting sleeve 51 somewhat shorter than the shaft 41. The outer end of the sleeve 51 is provided with an eccentric 52, the periphery of which is designed to be rotatively supported in what I shall term a gauge wheel 53. The eccentric 52 is fixed to the sleeve 51 by means of rivets 54. The inner end of the tubular shaft 41 is provided with a worm gear 55, while the inner end of the supporting sleeve 51 is provided with a worm gear 56. Both of said worm gears are mounted in the gear chamber 36. The gear 55 is provided with a worm 57, while the gear 56 is provided with a worm 58.

The upper surface of the gear casing 13 is provided with a bracket 59 having a pair of crank rods 60 rotatively mounted therein, said rods being spaced a slight distance apart. The inner ends of said rods are provided with links 61 which are connected therewith by means of suitable universal joints. The opposite ends of the links are connected with the worms 57 and 58 by suitable universal joints, so that if the inner one of the rods 60 is rotated, the worm 57 will be rotated, which in turn will cause the tubular shaft 41 to be rotated within the sleeve 51 and the angle of the saw blade 49 relative to the ground surface may be thereby varied, while if the outer one of the cranks 60 is rotated, the sleeve 51 will be rotated with the connecting gear devices above described, which will cause the eccentric 52 to be rotated and the outer end of the sleeve 51, together with the outer end of the tubular shaft, elevated or lowered, it being understood that the periphery of the wheel 53 is designed to engage the ground surface. The rotation of the sleeve 51 provides means for imparting a limited elevating and lowering movement to the saw blade.

The upper and inner surface of the second gear casing 30 is provided with a gear segment 62 operatively connected with the pinion 63, mounted on a crank shaft 64. The said shaft 64 is rotatively mounted in suitable brackets 65 projecting from the edge of the flange 14. The shaft 64 is also provided with a ratchet wheel 66 operatively connected with the ratchet 67 pivoted to one of the brackets 65. The segment 62, the pinion 63 and the crank shaft 64 provides means whereby the gear casing 30, together with the supporting sleeve 51 may be rotated about the longitudinal axis of the shaft 20, and provides means for elevating and lowering the saw blade 49, and placing the device in an inoperative position. The member 51 may be supported substantially in a vertical plane if so desired.

In Figure 1 it will be seen that the gear casing 30 and the member 17 of the gear casing 13 are supported in an inclined position, so that the forward end of the gear casing 19 may be brought to a position closer to the ground surface than would be permitted if the casing were arranged horizontally. However, the gear casing 13 may be rotated to any desired angle and there firmly held by the bolts 15 so that the shaft 38 may be held at various elevations from the ground surface and obviously the shaft 46 may be made of any desired length in order to permit the shaft 38 to be relatively high from the ground surface when the saw is close to the ground surface. This arrangement is desirable in cutting high brush. This provides means whereby the supporting sleeve 51 may assume a substantially horizontal position to bring the blade 49 in a position substantially parallel with the ground surface when the said blade is supported in an operative position for cutting standing brush and small trees. The blade is rotated through the shafts 46, 38, 20 and 12, and the gear devices connecting said shafts, said devices being operated directly from the power derived from the tractor, so the blade may be operated in either direction by proper manipulation of the clutch member 24, through the lever 27 and the forward cutting edge of the saw elevated or lowered by rotating the tubular shaft 41.

It sometimes is desirable, however, to use the saw blade for cutting horizontally arranged logs into short sections, which may be easily and quickly accomplished with my device by simply rotating the shaft 41 until the member 42 assumes a substantially horizontal position instead of a vertical position, and adjusting the angle of the gear casings 13 and 30 to a horizontal position instead of an inclined position, by removing the bolts 15 and rotating the casing 13 until the desired horizontal position is secured, and then replacing the bolts rigidly securing the casing in position. It will then be seen that the saw blade 45 may be oscillated through a vertical plane to make a perpendicular cut through a horizontal log. The swinging movement is accomplished by operating the crank 64. By this means the crank 64 provides a suitable feed device for the saw, if so desired, or the saw may be manually elevated and lowered by grasping the outer end of the sleeve 51.

When the device is used for cutting horizontal logs into short sections, it is preferable to remove the gauge wheel 53, which may be easily and quickly accomplished by removing one of the annular plates 68, which will then permit the said wheel to be removed from the eccentric 52 and passed over the outer end of the shaft 41, and the portion 42, the saw blade 49 being first removed. The saw blade may then be replaced and the device is then ready for operation.

In the drawings, I have illustrated my device applied to a tractor. It will readily be seen that the casing 13 may be secured to any other portable skid or movable device on which is mounted a suitable power shaft to take the place of the shaft 12, without departing from the spirit of my invention.

Thus it will be seen that I have provided a saw attachment particularly adapted for cutting down standing brush and small trees. It is very desirable to operate the saw blade close to the ground surface, at a point where the brush is rigidly supported against vibration, due to the cutting action of the blade.

By providing the gauge wheel 53, I have provided means whereby the blade will automatically be maintained at the proper elevation best suited to the work for which it is intended. The device is so arranged that the saw will be continuously operated as the tractor is advanced and the upstanding brush will be rapidly cut; or the device may be employed for cutting small trees, if so desired, which is best accomplished by supporting the gear casings in a substantially vertical position, which would then permit the arm 51 to swing in a horizontal plane, so that the crank 64 may be employed for feeding the saw. In this case, a somewhat smaller wheel 53 may be substituted, and the blade 49 provided with a shorter hub 48. The wheel could then be employed for gauging the horizontal elevation of the saw.

I claim as my invention:

1. A saw device comprising a gear casing, a second gear casing pivotally supported thereon, a supporting sleeve rotatively mounted in said second gear casing, an eccentric on the outer end of said sleeve, a gauge wheel rotatively mounted on the eccentric, a tubular shaft rotatively mounted in said supporting sleeve, said shaft having a perpendicular portion, a shaft rotatively mounted in said tubular shaft, a shaft rotatively mounted in said perpendicular portion, a saw blade on the outer end of the last said shaft, gear devices for connecting said shafts, means for rotating the first said shaft, means for rotating the second gear casing relative to the first gear casing, means for rotating said supporting sleeve, and means for rotating said tubular shaft.

2. In a saw device, the combination of a supporting frame having a power shaft, a gear casing secured to said frame for receiving said shaft and adapted to be adjusted rotatively about said shaft, a second gear casing rotatively mounted on the first gear casing on an axis perpendicular to the power shaft, a tubular shaft rotatively mounted in said second gear casing perpendicular to the pivotal movement of said second gear casing, the outer end of said tubular shaft being provided with a perpendicular portion, a saw shaft rotatively mounted in said perpendicular portion, a saw blade for said shaft, a shaft rotatively mounted in said tubular shaft and operatively connected with said saw shaft, a shaft within said second gear casing and rotatively mounted within the pivot axis of said second gear casing, means for operatively connecting the power shaft with the last said shaft, and means for operatively connecting the last said shaft, with the shaft rotatively mounted within said tubular shaft.

3. In a saw device, the combination of a supporting frame having a power shaft, a gear casing secured to said frame for receiving said shaft and adapted to be adjusted rotatively about said shaft, a second gear casing rotatively mounted on the first gear casing on an axis perpendicular to the power shaft, a tubular shaft rotatively mounted in said second gear casing perpendicular to the pivotal movement of said second gear casing, the outer end of said tubular shaft being provided with a perpendicular portion, a saw shaft rotatively mounted in said perpendicular portion, a saw blade for said shaft, a shaft rotatively mounted in said tubular shaft and operatively connected with said saw shaft, a shaft within said second gear casing and rotatively mounted within the pivot axis of said second gear casing, means for operatively connecting the power shaft with the last said shaft, means for operatively connecting the last said shaft with the shaft rotatively mounted within said tubular shaft, means for rotating said second gear casing, and means for rotating said tubular shaft.

4. In a saw device, the combination of a supporting frame having a power shaft, a gear casing secured to said frame for receiving said shaft and adapted to be adjusted rotatively about said shaft, a second gear casing rotatively mounted on the first gear casing on an axis perpendicular to the power shaft, a tubular shaft rotatively mounted in said second gear casing perpendicular to the pivotal movement of said second gear casing, the outer end of said tubular shaft being provided with a perpendicular portion, a saw shaft rotatively mounted in said perpendicular portion, a saw blade for said shaft, a shaft rotatively mounted in said tubular shaft and operatively connected with said saw shaft, a shaft within said second gear casing and rotatively mounted within the pivot axis of said second gear casing, means for operatively connecting the power shaft with the last said shaft, means for operatively connecting the last said shaft with the shaft rotatively mounted within said tubular shaft, a supporting sleeve rotatively mounted on said tubular shaft, the outer end of said sleeve being provided with an eccentric, a gauge wheel rotatively mounted on said eccentric, means for rotating said supporting sleeve, means for rotating said tubular shaft, and means for rotating said second gear casing.

5. In combination with a tractor having a power shaft, a sleeve designed to be supported normally horizontally and transversely from said tractor, a gauge wheel for supporting the outer end of said sleeve, means for elevating and lowering the outer end of said sleeve relative to the center of said wheel, a tubular shaft rotatively mounted in said sleeve, a saw shaft, means for supporting the saw shaft perpendicular to said tubular shaft, a shaft rotatively mounted in said tubular shaft operatively connected with said saw shaft, and means for operatively connecting the last said shaft with said power shaft.

Des Moines, Iowa, May 27, 1927.

OWEN M. CRUMLY.